Patented Sept. 9, 1930

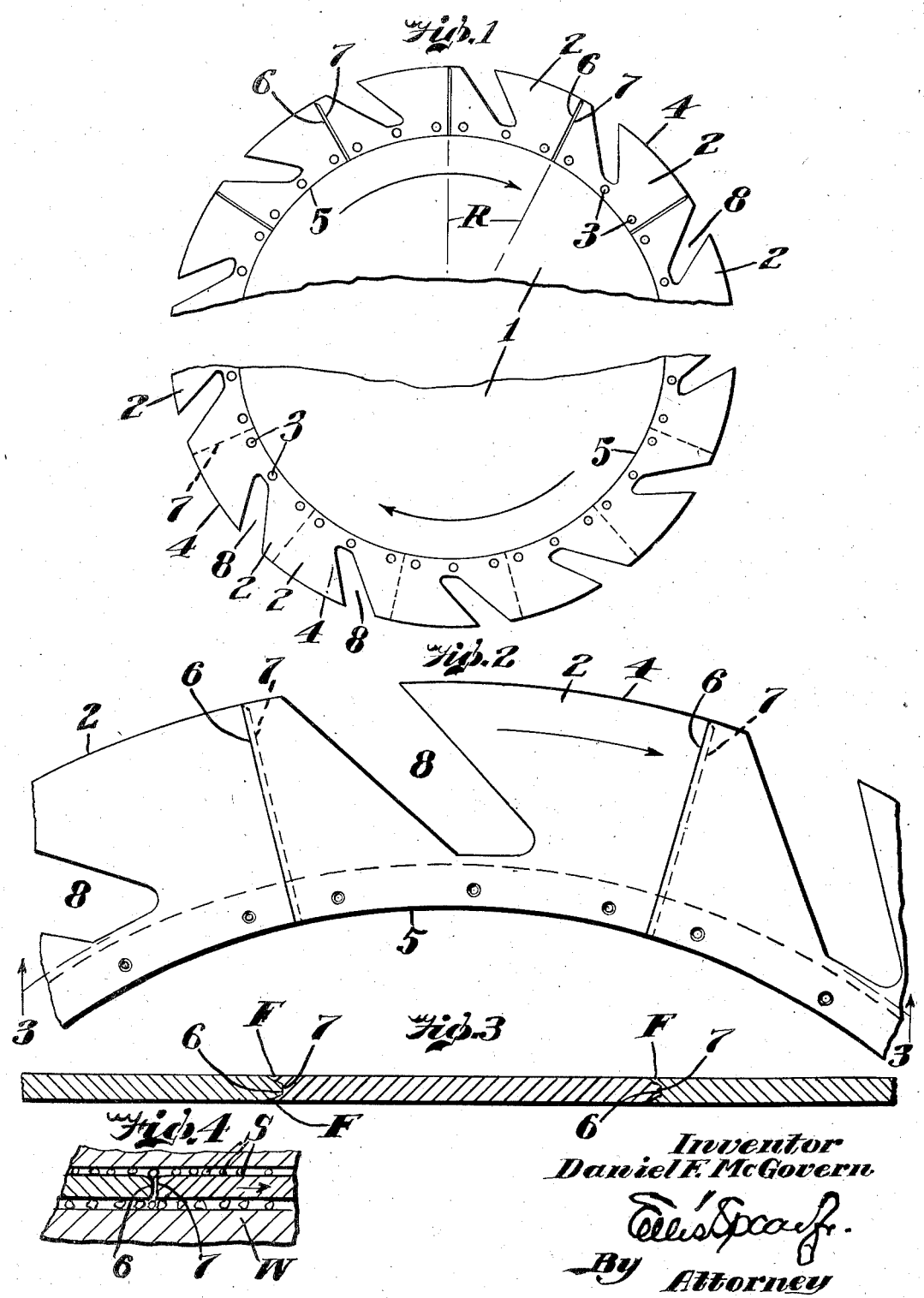

1,775,354

UNITED STATES PATENT OFFICE

DANIEL FREDERICK McGOVERN, OF MONTPELIER, VERMONT

STONE SAW

Application filed July 16, 1929. Serial No. 378,748.

My present invention involves saws of the detachable tooth type and particularly those intended for stone sawing. In such use the cutting is effected by an abradant such as chilled shot and the use of such a medium as is well known while involving a variety of difficulties is generally approved as the best known basis of general sawing operation.

One of the difficulties has been to provide saw teeth which would operate with such a material as "shot" with the desired efficiency, and a reasonable operating economy especially as to the triple dilemma of replaceability of the tooth, its strength when in place and its cheapness as an element of wear which must be frequently replaced.

In my previous Patent No. 1,690,544, I disclosed a saw and saw tooth of this type and while not limited to that particular construction my present invention or discovery being somewhat sequent thereto may be advantageously described by reference to my said patent.

I have therefore shown in the accompanying drawings as illustrative of my present invention a structure of the general type of my prior patent. In these drawings:

Fig. 1 shows broken apart two portions of such a stone saw, the upper portion before use, and the lower portion after use.

Fig. 2 is an enlarged detail of tooth assembly.

Fig. 3 a somewhat exaggerated section on the arc 3—3, of Fig. 2, and Fig. 4 is a diagrammatic section illustrating the interlocking action which occurs in the use of the saw.

I have indicated at 1 a saw blade of conventional type and at 2 a plurality of detachable and replaceable tooth units in accordance with my invention and riveted or otherwise secured to the periphery of the saw blade, as indicated at 3.

Each tooth is of generally rectangular shape presenting an outer or cutting edge 4 which is developed on the arc of a circle substantially concentric to the axis of rotation of the saw blade, an inner or attaching edge 5 which is bifurcated to straddle the peripheral edge of the saw blade.

Each tooth is notched between its front and rear edges, as indicated at 8, to provide an abrasive pocket opening into the cutting edge 4 of the tooth, preferably at an angle thereto. As shown, the notches 8 are curved and lead from the cutting edge 4 forwardly and inwardly, the resultant pocket thus being so shaped as to insure entrapment and retention of adequate abrasive therein.

I thus provide a blade with detachable teeth in which the front and rear edges of the teeth are radial to the axis of rotation of the disc (as indicated by the radius lines R, Fig. 1) and are interlocked with each other so as to present maximum strength and rigidity, and in which the cutting edge of each tooth is notched to provide a re-entrant abrasive pocket intermediate of said interlocked front and rear edges.

By my construction, I provide continuous cutting surface which can be worn down practically to the blade edge itself without appreciable loss of efficiency in cutting action. The location of the abrasive pocket in the cutting edge itself of the tooth insures that an adequate amount of abrasive will be maintained between the cutting edge of the tooth and the bottom of the saw kerf so long as any of the cutting surface remains, and the front and rear edge interlocked of adjacent teeth reduces vibration and disalignment of teeth as well as imparting peripheral strength and rigidity to the teeth series as a whole.

In my previous patent, above mentioned, I describe a tongue and groove construction for the sides of the teeth, so as to dovetail with the similar edges of the next adjacent teeth when the teeth are assembled on the blade, thereby presenting a solid unbroken tooth series with no gaps or spaces between adjacent teeth. This resulted in increased rigidity and strength, and prevents buckling or twisting of the teeth out of alinement with each other in the operation of the saw.

The cost of making the teeth with tongue and groove interlock was, however, considerable and only justified by the satisfaction in result. The concept of my present invention then occurred. I had detected a tendency in the teeth I had been using to burr or fin back on their rear edges. It seemed of no disadvantage but I then conceived the idea of utilizing this tendency and provide ungrooved teeth which would become interlocked in use by the very wear of their usage.

According to my present invention I have my teeth substantially straight-sided and on substantially a radial line and assemble them as closely adjacent as is convenient. In this tolerance of assembly I also gain a great advantage. To assemble teeth on the periphery of a large saw there is much difficulty if the interlock of tongued and grooved sides has to be considered. Slight variances in dimension multiply rapidly at the periphery. Furthermore, the replacement of an odd tooth broken by accident was often troublesome.

My present invention gives a wide tolerance and makes assembly and replacement easy and saves valuable time in shut down. I have indicated on the drawing the forward edge of my tooth 2 at 6 and the rear edge at 7. These, however, must not be confused with my prior patent. In practice the contour of these edges may be disregarded, although as shown in Fig. 4, the forward edge 6 is preferably (and usually is) not an absolutely square cut edge.

Here again I utilize a tolerance or what even might be otherwise a crudeness to attain a most advantageous result.

As indicated in Fig. 4 the lack of sharp corners on the edge 6 is an advantage. In practice I blunt these corners as in Fig. 4. This facilitates and hastens the interlock indicated in Fig. 3, which is effected by the action of the shot S retarded by the wall W of the kerf. This action spins or draws the relatively soft metal of the tooth to produce the overlapping fin F which draws over the edge 6 of each succeeding tooth.

In this way I provide for a tooth interlock which becomes more and more effective until under usage instead of wearing out as in the case of dependence of previously provided tongue and groove, there is a constant physical metallic confluence between the teeth so that as indicated in the lower part of Fig. 1 the teeth become in effect an integral or physically autogenously welded band on the blade 1.

This opens up a new phase of usefulness for the straight or radially sided saw tooth of whatever type or shape. Its economies and advantages are obvious to all familiar with its art and protection is claimed accordingly.

What I therefore claim and desire to secure by Letters Patent is:—

1. In a stone saw adapted to be used with an abradant, a blade having a plurality of adjacent teeth, said teeth being formed of ductile metal and having their opposing edges unchanneled and normally spaced apart from each other distances not greater than the limits of ductile extensibility of the teeth whereby the action of the abradant retarded in the saw kerf causes the teeth to spin or draw into interlock with each other in the use of the saw.

2. In a rotary stone saw adapted to be used with an abradant, a blade, and a plurality of inserted teeth secured to said blade, said teeth being formed of ductile metal and having substantially radial unchanneled opposing edges normally spaced apart from each other distances not greater than the limits of ductile extensibility of the teeth whereby the action of the abradant retarded in the saw kerf causes the teeth to spin or draw into interlock with each other in the use of the saw.

In testimony whereof I affix my signature.
DANIEL FREDERICK McGOVERN.